US012756276B2

(12) United States Patent
Seo

(10) Patent No.: US 12,756,276 B2
(45) Date of Patent: Oct. 6, 2026

(54) MOTOR

(71) Applicant: HYUNDAI MOBIS CO., LTD., Seoul (KR)

(72) Inventor: Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 187 days.

(21) Appl. No.: 18/763,213

(22) Filed: Jul. 3, 2024

(65) Prior Publication Data

US 2025/0167638 A1 May 22, 2025

(30) Foreign Application Priority Data

Nov. 20, 2023 (KR) ........................ 10-2023-0161422

(51) Int. Cl.

*H02K 11/25* (2016.01)
*H02K 1/16* (2006.01)
*H02K 5/22* (2006.01)

(52) U.S. Cl.

CPC ............... *H02K 11/25* (2016.01); *H02K 1/16* (2013.01); *H02K 5/225* (2013.01)

(58) Field of Classification Search

CPC .......... H02K 11/25; H02K 5/225; H02K 5/22; H02K 1/16
USPC ................................................. 310/68 R, 71
See application file for complete search history.

(56) References Cited

U.S. PATENT DOCUMENTS

2017/0019000 A1* 1/2017 Sakamoto ................ G01K 1/14
2022/0029498 A1* 1/2022 Lee ........................ H02K 3/522

* cited by examiner

*Primary Examiner* — Alexander A Singh
(74) *Attorney, Agent, or Firm* — MORGAN, LEWIS & BOCKIUS LLP

(57) ABSTRACT

The present disclosure relates to a motor including a stator including a wound coil, a terminal provided to be in electrical contact with the coil, a holder configured to support the terminal, a sensor holder provided on the holder, and a temperature sensor supported on the sensor holder and provided to be in contact with the coil, thereby obtaining an advantageous effect of simplifying a structure and assembling process and improving stability and reliability.

9 Claims, 9 Drawing Sheets

MOTOR

CROSS-REFERENCE TO RELATED APPLICATION

This application claims priority to and the benefit of Korean Patent Application No. 10-2023-0161422 filed in the Korean Intellectual Property Office on Nov. 20, 2023, the entire contents of which are incorporated herein by reference.

TECHNICAL FIELD

The present disclosure relates to a motor, and more particularly, to a motor capable of simplifying a structure and assembling process and improving stability and reliability.

BACKGROUND ART

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores provided by stacking electrical steel sheets, and stator coils wound around the stator cores.

A busbar is disposed at an upper side of the stator, and the stator coils are connected to an external power source through the busbar.

The busbar may be structured to include a plurality of terminals inside a ring-shaped holder, and the terminals may be constituted as a combination of phase terminals connected to U-phase, V-phase, and W-phase power sources, and a neutral terminal that connects the phase terminals.

Meanwhile, high-temperature heat is produced when the motor operates. If the temperature of the motor is raised to a predetermined temperature or higher, the efficiency and lifespan of the motor may deteriorate. Therefore, it is necessary to monitor the temperature of the motor and stop the operation of the motor when the temperature of the motor is raised to a predetermined temperature or higher.

In the related art, in order to mount a temperature sensor, which is used to monitor a temperature of the motor, on the coil, the temperature sensor disposed on the coil needs to be supported by using a separate jig, and the temperature sensor needs to be fixed by using a bonding agent (e.g., epoxy), which causes a problem in that a structure and manufacturing process are complicated, and manufacturing costs are increased.

In addition, in the related art, when the motor vibrates or an external impact is applied to the motor, a bonded portion of the temperature sensor is easily damaged or withdrawn from the coil.

Therefore, recently, various studies have been conducted to simplify the structure for mounting the temperature sensor and improve the stability and reliability, but the study results are still insufficient. Accordingly, there is a need to develop a technology to simplify the structure for mounting the temperature sensor and improve the stability and reliability.

SUMMARY

The present disclosure has been made in an effort to provide a motor capable of simplifying a structure and assembling process and improving stability and reliability.

In particular, the present disclosure has been made in an effort to mount a temperature sensor, which is used to monitor a temperature of the motor, on a coil without using a separate jig and a bonding agent.

The present disclosure has also been made in an effort to stably maintain a mounted state of the temperature sensor and minimize damage to or withdrawal of the temperature sensor.

The present disclosure has also been made in an effort to reduce costs, improve working efficiency, and shorten manufacturing time.

The present disclosure has also been made in an effort to minimize the erroneous assembly of the temperature sensor and improve accuracy.

In order to achieve the above-mentioned objects, an exemplary embodiment of the present disclosure provides a motor including: a stator including a wound coil; a terminal provided to be in electrical contact with the coil; a holder configured to support the terminal; a sensor holder provided on the holder; and a temperature sensor supported on the sensor holder and provided to be in contact with the coil.

This is to simplify a structure of the motor and a process of assembling the motor and improve stability and reliability of the motor.

That is, in the related art, in order to mount a temperature sensor, which is used to monitor a temperature of a motor, on a coil, the temperature sensor disposed on the coil needs to be supported by using a separate jig, and the temperature sensor needs to be fixed by using a bonding agent (e.g., epoxy), which causes a problem in that a structure and manufacturing process are complicated, and manufacturing costs are increased. Moreover, in the related art, when the motor vibrates or an external impact is applied to the motor, a bonded portion of the temperature sensor is easily damaged or withdrawn from the coil.

In contrast, in the embodiment of the present disclosure, the temperature sensor is supported to be in contact with the coil by means of the sensor holder provided on the holder. Therefore, it is possible to obtain an advantageous effect of simplifying the structure and assembling process and improving the stability and reliability.

Among other things, in the embodiment of the present disclosure, the temperature sensor is supported to be in contact with the coil by means of the sensor holder without using a separate jig and a bonding agent, such that the process of assembling the temperature sensor may be simplified. Therefore, it is possible to obtain an advantageous effect of reducing costs and improving productivity.

Moreover, in the embodiment of the present disclosure, the temperature sensor is provided in the state in which the temperature sensor is modularized together with (assembled in advance to) the holder, such that the temperature sensor, which is modularized together with the holder, may be assembled together with the holder during the process of assembling the holder (the temperature sensor may come into contact with the coil at the same time when the holder is assembled). Therefore, it is possible to exclude an additional process of assembling the temperature sensor and automate the process of assembling the temperature sensor.

The holder may have various structures capable of supporting the terminal.

According to the exemplary embodiment of the present disclosure, the holder may include: a holder body configured to support the terminal; and a holder cover stacked on the holder body and configured to cover the terminal, and the sensor holder may be provided on the holder cover.

According to the exemplary embodiment of the present disclosure, the temperature sensor may include: a sensor body; and a sensor cable electrically connected to the sensor body.

The sensor holder may be variously changed in number and position in accordance with required conditions and design specifications.

According to the exemplary embodiment of the present disclosure, the sensor holder may include: a first sensor holder configured to support the sensor body; and a second sensor holder spaced apart from the first sensor holder in a circumferential direction of the holder and configured to support the sensor cable.

The sensor holder may have various structures capable of being supported on the holder to bring the temperature sensor into contact with the coil.

According to the exemplary embodiment of the present disclosure, the sensor holder may include: a first sensor support portion provided on an inner circumferential surface of the holder and protruding from one surface of the holder that faces the coil; and a second sensor support portion provided at an end of the first sensor support portion and configured such that the first sensor support portion and the second sensor support portion collectively define a sensor accommodation portion in which the temperature sensor is accommodated.

According to the exemplary embodiment of the present disclosure, the second sensor support portion may be configured to be elastically moved toward or away from the first sensor support portion, and the temperature sensor may be elastically supported between the first sensor support portion and the second sensor support portion.

As described above, in the embodiment of the present disclosure, the sensor body is elastically supported between the first sensor support portion and the second sensor support portion. Therefore, it is possible to obtain an advantageous effect of minimizing the withdrawal of the temperature sensor and more stably maintaining the arrangement state of the temperature sensor with respect to the sensor holders and the coils.

According to the exemplary embodiment of the present disclosure, the motor may include: a guide protrusion provided on an inner surface of the holder cover and configured to support the first sensor support portion on the holder cover.

As described above, in the embodiment of the present disclosure, the first sensor support portion is supported by the guide protrusion. Therefore, it is possible to obtain an advantageous effect of minimizing deformation (e.g., bending deflection) of the first sensor support portion and more stably maintaining the arrangement state of the temperature sensor.

According to the exemplary embodiment of the present disclosure, the motor may include: a first guide groove provided in the holder body and configured to accommodate the guide protrusion; and a second guide groove provided in the holder body and configured to communicate with the first guide groove and accommodate the first sensor support portion.

As described above, in the embodiment of the present disclosure, the guide protrusion and the first sensor support portion are accommodated in the first guide groove and the second guide groove, such that the guide protrusion and the first sensor support portion may be more securely fixed onto the holder body. Therefore, it is possible to obtain an advantageous effect of stably maintaining the mounted state of the temperature sensor and minimizing damage to and withdrawal of the temperature sensor.

According to the exemplary embodiment of the present disclosure, the motor may include: a coupling hole provided in the holder body; and a snap-fit coupling portion provided on the holder cover and coupled to the coupling hole in a snap-fit manner.

As described above, in the embodiment of the present disclosure, the snap-fit coupling portion provided on the holder cover is coupled to the coupling hole provided in the holder body, which may stably maintain the state in which the holder cover presses the temperature sensor against the coil. Therefore, it is possible to obtain an advantageous effect of more stably maintaining the contact state between the temperature sensor and the coil.

In addition, in case that the posture and position of the snap-fit coupling portion are misaligned with the coupling hole, the snap-fit coupling portion cannot be accurately inserted into the coupling hole, and the holder cover is disposed to be movable (rotatable) in an abnormal posture with respect to the holder body. Therefore, an operator may easily recognize whether the holder cover is erroneously assembled.

According to the exemplary embodiment of the present disclosure, the motor may include a support groove provided in one surface of the holder body that faces the holder cover, and a support protrusion provided on the holder cover and accommodated in the support groove.

As described above, in the embodiment of the present disclosure, the support protrusion and the support groove are provided to be disposed between the adjacent coils. Therefore, it is possible to obtain an advantageous effect of improving insulation properties, more effectively suppressing vibration and noise, and minimizing withdrawal of foreign substances produced during a process of fusing the coil and the terminal.

According to the exemplary embodiment of the present disclosure, the temperature sensor and the sensor holder may be integrated by injection molding.

DETAILED DESCRIPTION

Figure 1:
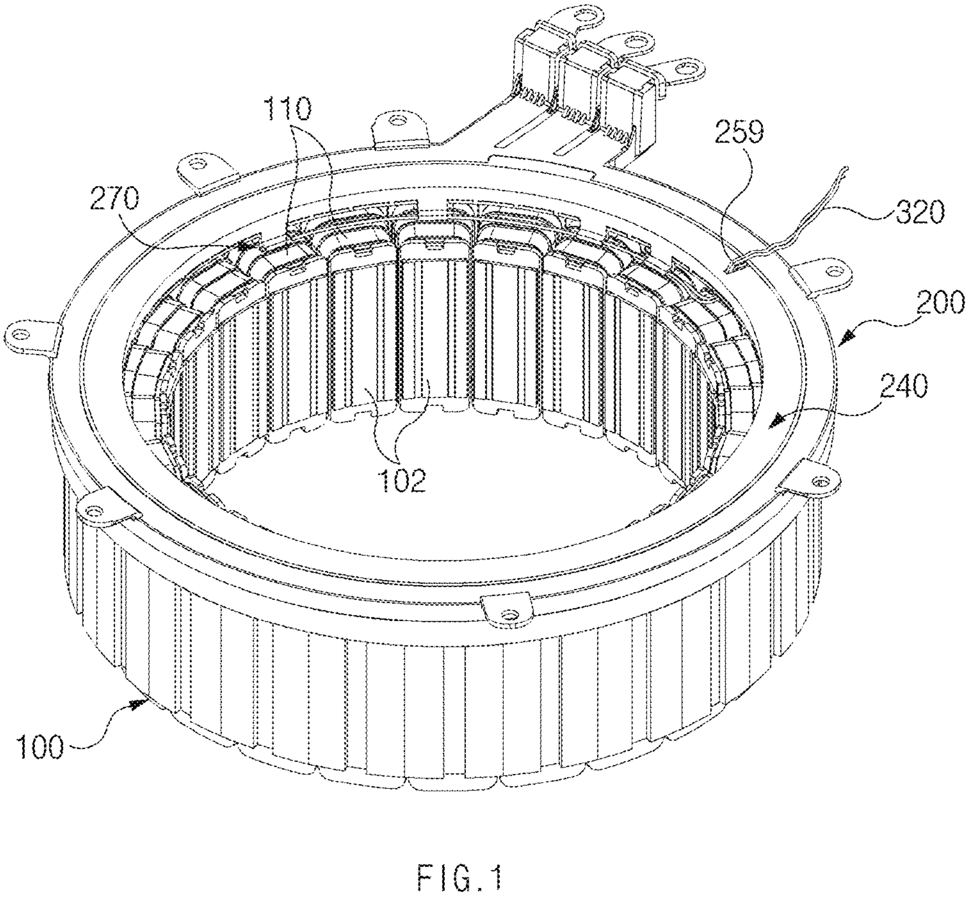
FIG. 1 is a view for explaining a motor according to an embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

With reference to FIGS. 1 to 9, a motor 10 according to an embodiment of the present disclosure includes a stator 100 with wound coils 110, terminals 210 provided to be in electrical contact with the coils 110, a holder 240 configured to support the terminals 210, sensor holders 270 provided on the holder 240, and a temperature sensor 300 supported on the sensor holders 270 and provided to be in contact with the coils 110.

For reference, the motor 10 according to the embodiment of the present disclosure may be mounted in various subjects in accordance with required conditions and design specifications. The present disclosure is not restricted or limited by the type and structure of the subject.

For example, the motor 10 according to the embodiment of the present disclosure may be used as a drive motor for an environmentally friendly vehicle, such as a hybrid vehicle and/or an electric vehicle, which obtains driving power from electrical energy.

For example, the motor 10 may be an inner-rotor-type synchronous motor and include the stator 100 seated on a housing, and a rotor (not illustrated) rotatably installed in the stator 100 with a predetermined air gap from the stator 100. A busbar unit 200 may be connected to the stator 100.

Figure 2:
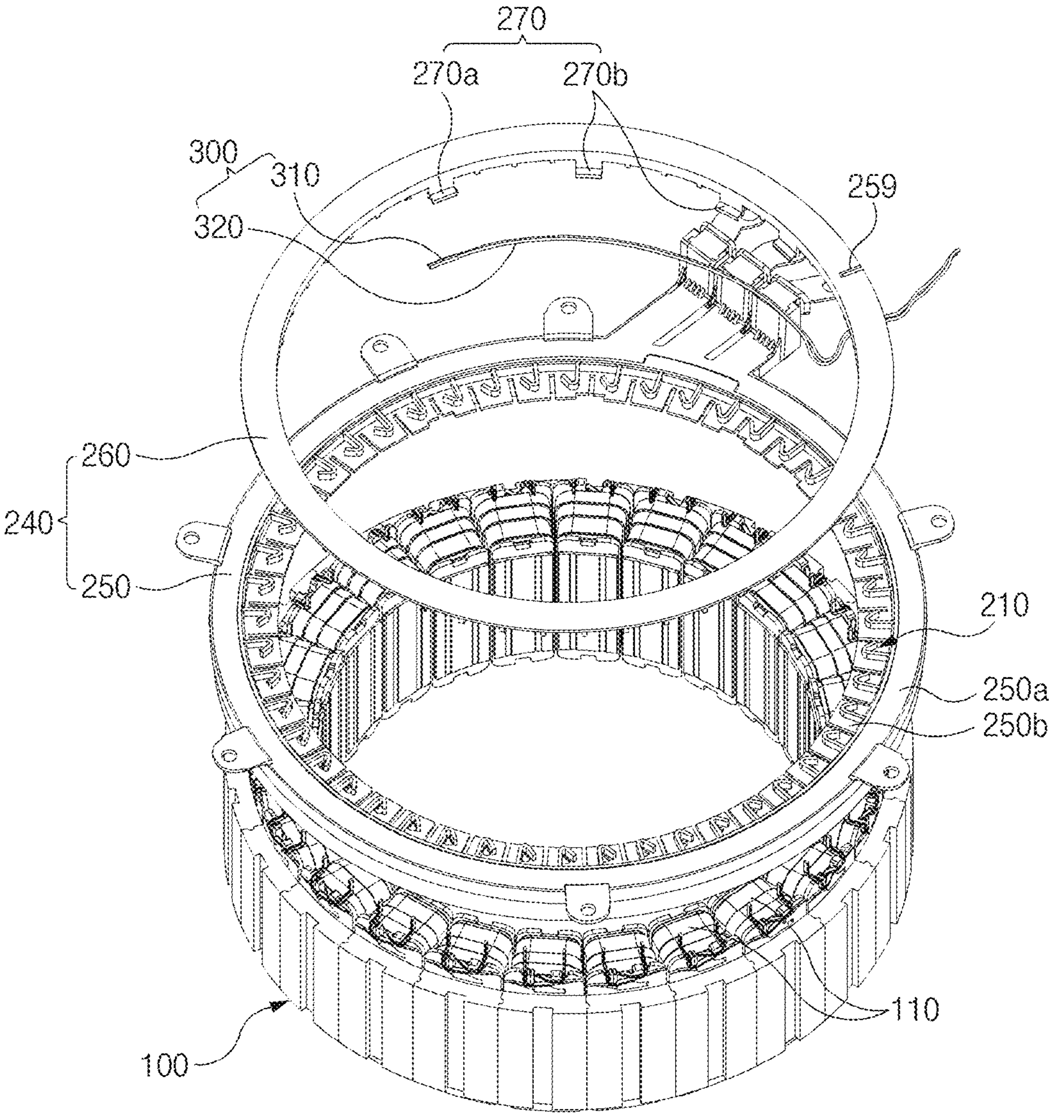
FIG. 2 is an exploded perspective view for explaining the motor according to the embodiment of the present disclosure.
Figure 3:
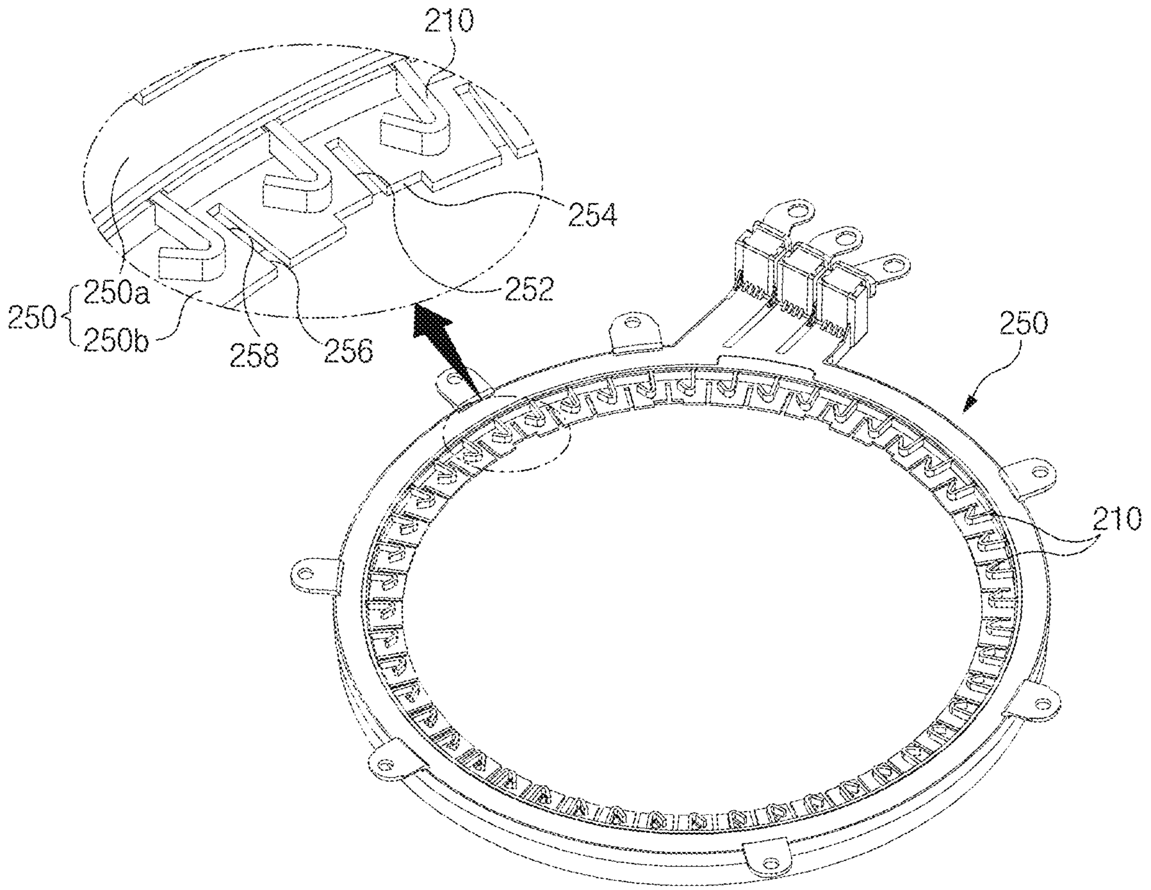
FIGS. 3 to 5 are views for explaining a holder of the motor according to the embodiment of the present disclosure.
Figure 4:
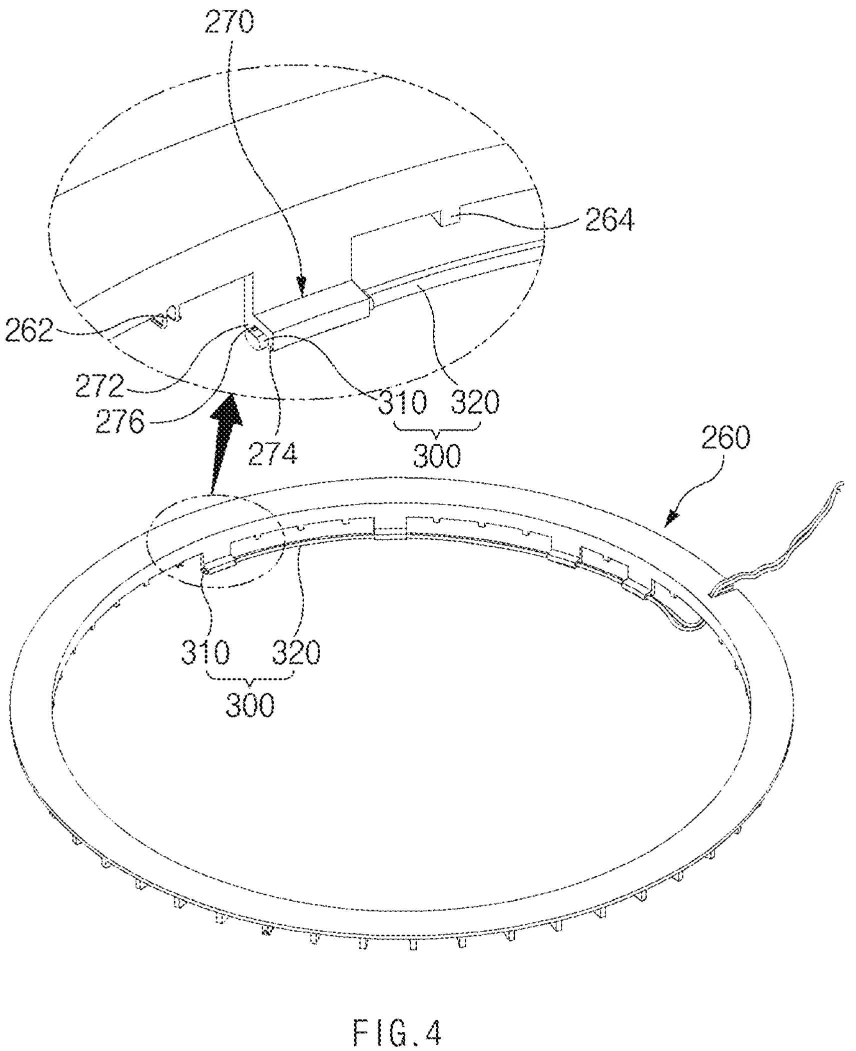
Figure 5:
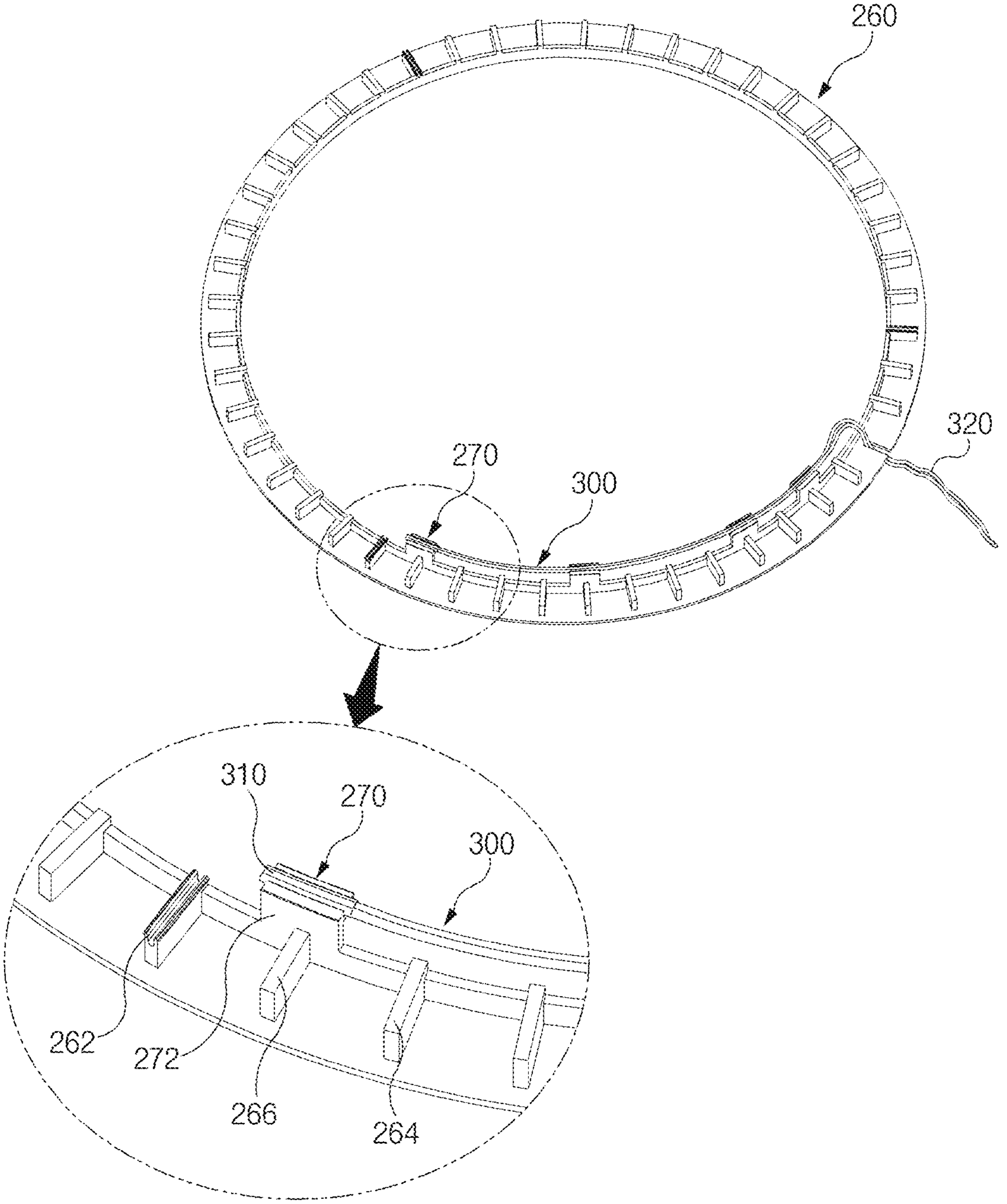

With reference to FIGS. 1 and 2, the stator 100 may be seated on the housing (not illustrated). The coils 110 are wound around the stator 100 to induce an electrical interaction between the stator and the rotor.

For example, the stator 100 may include a plurality of split cores 102 provided to collectively define a ring shape, and a support ring (not illustrated) provided to surround outer circumferential surfaces of the plurality of split cores 102.

The split core 102 may be variously changed in number and structure in accordance with required conditions and design specifications. The present disclosure is not restricted or limited by the number of split cores 102 and the structure of the split core 102.

More specifically, the split core 102 may be configured by stacking a plurality of electrical steel sheets in an axial direction of the rotor.

A bobbin (not illustrated) (made of plastic, for example) is provided around each of the split cores 102, and the coil 110 is wound around the bobbin.

In the embodiment of the present disclosure illustrated and described above, the example has been described in which the stator 100 includes the plurality of split cores 102. However, according to another embodiment of the present disclosure, the stator may include a single core.

The rotor is configured to be rotated by an electrical interaction between the rotor and the stator 100.

For example, the rotor may include a rotor core (not illustrated) and magnets (not illustrated). The rotor core may have a structure made by stacking a plurality of circular plates each provided in the form of a thin steel sheet or be provided in the form of a bin.

A hole (not illustrated) may be provided at a center of the rotor, and a shaft may be coupled to the hole. Protrusions (not illustrated) may protrude from an outer circumferential surface of the rotor core and guide the magnets. The magnets may be attached to the outer circumferential surface of the rotor core and spaced apart from one another at predetermined intervals in a circumferential direction of the rotor core.

In addition, the rotor may include a can member (not illustrated) configured to surround the magnets and inhibit the separation of the magnets.

The busbar unit 200 may include the terminals 210 and the holder 240 and be disposed above (or below) the stator 100.

The terminals 210 electrically connect the coils 110 of the stator 100 to an external power source.

According to the exemplary embodiment of the present disclosure, the terminal 210 may be at least one of phase terminals (a U-phase terminal, a V-phase terminal, and a W-phase terminal) respectively connected to a U-phase power source, a V-phase power source, and a W-phase power source and a neutral terminal for electrically connecting the phase terminals. For example, the busbar unit may include a total of four terminals (the U-phase terminal, the V-phase terminal, the W-phase terminal, and the neutral terminal).

More specifically, the terminal 210 includes a body (not illustrated) accommodated in the holder 240, and a terminal portion (not illustrated) protruding from an inner circumferential surface of the body and connected to the coil 110.

The body may be variously changed in structure and shape in accordance with required conditions and design specifications. For example, the body may have a single-layered structure and be provided as a band member in the form of an arc (or a ring) having a predetermined curvature.

According to another embodiment of the present disclosure, the body may have a double-layered structure (multi-layer structure) having a bent portion.

The terminal portion is provided on the inner circumferential surface of the body. An end of the coil 110 of the stator 100 is connected to the terminal portion.

The terminal portion may have various structures capable of being electrically connected to (e.g., fused with) the end of the coil. The present disclosure is not restricted or limited by the structure and shape of the terminal portion.

In addition, the terminal 210 may include a power terminal part (not illustrated) protruding from an outer circumferential surface of the holder 240.

The power terminal part extends from an outer surface of the body and protrudes from the outer circumferential surface of the holder 240. The power terminal part may be electrically connected to each of external power cables corresponding to the respective phases (the U-phase, the V-phase, and the W-phase).

With reference to FIGS. 2 to 5, the holder 240 supports the arrangement state of the terminals 210 and electrically insulates the terminals 210.

The holder 240 may have various structures capable of supporting the terminals 210. The present disclosure is not restricted or limited by the structure and shape of the holder 240.

According to the exemplary embodiment of the present disclosure, the holder 240 may include a holder body 250 configured to support the terminals 210, and a holder cover 260 stacked on the holder body 250 to cover the terminals 210.

For example, the holder body 250 may include a body holder portion **250*a* configured to support the bodies of the terminals 210, and terminal holder portions 250*b* provided on an inner circumferential surface of the body holder portion 250*a* and configured such that the terminal portions of the terminals 210 are disposed (e.g., seated) on the terminal holder portions 250*b***.

The body holder portion **250*a* may be variously changed in material and shape in accordance with required conditions and design specifications. The present disclosure is not restricted or limited by the material and shape of the body holder portion 250*a***.

For example, the body holder portion **250*a* may be provided in the form of a hollow ring that surrounds the body. The body holder portion 250*a*** may be configured as a molded product (made of an insulating material, for example) provided by injection molding.

The terminal holder portion **250*b* is integrated with the inner circumferential surface of the body holder portion 250*a* to partially cover an upper region of the stator 100 (an upper portion of the coil 110). The terminal holder portion 250*b*** is configured to support the terminal portion.

The terminal holder portion **250*b* may have various structures capable of supporting the terminal portion. The present disclosure is not restricted or limited by the structure of the terminal holder portion 250*b*. For example, one end (outer circumferential end) of the terminal holder portion 250*b* may be fixed to the inner circumferential surface of the body holder portion 250*a*, and the other end (inner circumferential end) of the terminal holder portion 250*b*** may be provided in the form of a cantilever disposed as a free end.

In particular, the terminal holder portion **250*b* may be integrated with the body holder portion 250*a*** by injection molding. According to another embodiment of the present disclosure, the terminal holder portion may be manufactured separately and then coupled to the body holder portion.

The temperature sensor 300 is configured to monitor a temperature of the coil 110 (a temperature of the motor 10).

A typical contact temperature sensor 300 capable of monitoring the temperature of the motor 10 may be used as the temperature sensor 300. The present disclosure is not restricted or limited by the type and sensing methods of the temperature sensor 300.

According to the exemplary embodiment of the present disclosure, the temperature sensor 300 may include a sensor body 310 (e.g., a thermocouple or a thermistor), and a sensor cable 320 electrically connected to the sensor body 310.

The sensor body 310 and the sensor cable 320 may be supported by the sensor holders 270. An end of the sensor cable 320 may be exposed to an outer surface of the holder 240 through a through-hole 259 provided in the holder 240.

The sensor holders 270 are provided on the holder 240 to support the state in which the temperature sensor 300 is in contact with the coils 110 without using a separate jig and a bonding agent.

According to the exemplary embodiment of the present disclosure, the sensor holder 270 may be integrated with the holder cover 260 by injection molding. According to another embodiment of the present disclosure, the sensor holder may be manufactured separately from the holder and coupled (fastened or assembled) to the holder.

The sensor holder 270 may be variously changed in number and position in accordance with required conditions and design specifications. The present disclosure is not restricted or limited by the number and position of the sensor holder 270.

According to the exemplary embodiment of the present disclosure, the sensor holders 270 may include a first sensor holder **270*a* configured to support the sensor body 310, and second sensor holders 270*b* spaced apart from the first sensor holder 270*a* in a circumferential direction of the holder 240 and configured to support the sensor cable 320**.

Hereinafter, an example will be described in which only one first sensor holder **270*a* and three second sensor holders 270*b* are provided on the holder 240** and spaced apart from one another. Alternatively, two or fewer second sensor holders may be provided on the holder, or four or more second sensor holders may be provided on the holder.

The sensor holder 270 may have various structures capable of being supported on the holder 240 to bring the temperature sensor 300 into contact with the coils 110. The present disclosure is not restricted or limited by the structure and shape of the sensor holder 270.

According to the exemplary embodiment of the present disclosure, the sensor holder 270 may include a first sensor support portion 272 provided on an inner circumferential surface of the holder 240 and protruding from one surface of the holder 240 that faces the coils 110, and a second sensor support portion 274 provided at an end of the first sensor support portion 272 and configured such that the first sensor support portion 272 and the second sensor support portion 274 collectively define a sensor accommodation portion 276 in which the temperature sensor 300 is accommodated.

For example, the first sensor support portion 272 may have an approximately straight plate shape. The second sensor support portion 274 may have an approximately "L" shape. The sensor accommodation portion 276 may be provided between the first sensor support portion 272 and the second sensor support portion 274 and have an approximately "U" shape that faces an upper surface (based on FIG. 2) of the coil 110.

Figure 6:
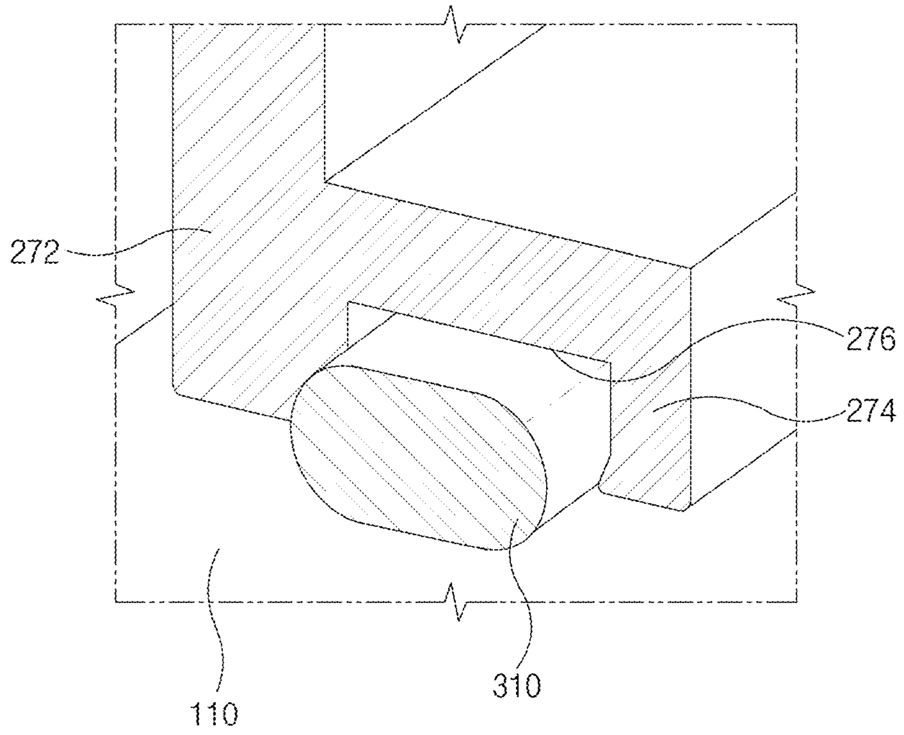
FIG. 6 is a view for explaining a sensor holder of the motor according to the embodiment of the present disclosure.

With reference to FIG. 6, according to the exemplary embodiment of the present disclosure, the second sensor support portion 274 may be provided to be elastically moved toward or away from the first sensor support portion 272.

The temperature sensor 300 may be elastically supported between the first sensor support portion 272 and the second sensor support portion 274.

In particular, an interval between the first sensor support portion 272 and the second sensor support portion 274 (a width of the sensor accommodation portion 276) may be slightly smaller than a width of the sensor body 310 in a radial direction of the holder 240 and slightly larger than a width of the sensor cable 320.

As described above, in the embodiment of the present disclosure, the sensor body 310 is elastically supported between the first sensor support portion 272 and the second sensor support portion 274. Therefore, it is possible to obtain an advantageous effect of minimizing the withdrawal of the temperature sensor 300 and more stably maintaining the arrangement state of the temperature sensor 300 with respect to the sensor holders 270 and the coils 110.

In addition, according to the exemplary embodiment of the present disclosure, a depth (depth in an upward/downward direction based on FIG. 6) of the sensor accommodation portion 276 may be smaller than a height (height in the upward/downward direction based on FIG. 6) of the sensor body 310.

As described above, in the embodiment of the present disclosure, a part (lower end) of the sensor body 310 is exposed (protrudes) to the outside of the sensor accommodation portion 276 in the state in which the sensor body 310 is accommodated in the sensor accommodation portion 276, such that the contact state between the sensor body 310 and the coil 110 may be more stably maintained.

According to the exemplary embodiment of the present disclosure, the motor 10 may include guide protrusions 266 provided on an inner surface of the holder cover 260 and configured to support the first sensor support portions 272 on the holder cover 260.

In particular, the guide protrusion 266 may be integrated with the holder cover 260 by injection molding. According to another embodiment of the present disclosure, the guide protrusion may be manufactured separately and then coupled to the holder cover.

The guide protrusion 266 may have various structures capable of supporting the first sensor support portion 272 on the holder cover 260. The present disclosure is not restricted or limited by the structure and shape of the guide protrusion 266.

For example, the guide protrusion 266 may have an approximately straight plate shape. The first sensor support portion 272 and the guide protrusion 266 may be connected to collectively define an approximately "T" shape. Alternatively, the guide protrusion may be provided in a protrusion or curved shape.

As described above, in the embodiment of the present disclosure, the first sensor support portion 272 is supported by the guide protrusion 266. Therefore, it is possible to obtain an advantageous effect of minimizing deformation (e.g., bending deflection) of the first sensor support portion 272 and more stably maintaining the arrangement state of the temperature sensor 300.

In particular, the motor 10 may include first guide grooves 252 provided in the holder body 250 and configured to accommodate the guide protrusions 266, and second guide grooves 254 provided in the holder body 250 and configured to communicate with the first guide grooves 252 and accommodate the first sensor support portions 272.

For example, the first guide groove 252 and the second guide groove 254 may be connected to collectively define an approximately "T" shape.

As described above, in the embodiment of the present disclosure, the guide protrusions 266 and the first sensor support portions 272 are accommodated in the first guide grooves 252 and the second guide grooves 254, such that the guide protrusions 266 and the first sensor support portions 272 may be more securely fixed onto the holder body 250. Therefore, it is possible to obtain an advantageous effect of stably maintaining the mounted state of the temperature sensor 300 and minimizing damage to and withdrawal of the temperature sensor 300.

According to the exemplary embodiment of the present disclosure, the motor 10 may include coupling holes 256 provided in the holder body 250, and snap-fit coupling portions 262 provided on the holder cover 260 and coupled to the coupling holes 256 in a snap-fit manner.

The snap-fit coupling portion 262 may be elastically coupled to the coupling hole 256 in a snap-fit manner by using elasticity of a material (e.g., a plastic material). The present disclosure is not restricted or limited by the shape and structure of the snap-fit coupling portion 262.

For example, the coupling hole 256 may be provided in an upper surface of the holder body 250 (an upper surface of the body holder portion) that faces the holder cover 260, and the snap-fit coupling portion 262 may be provided on a bottom surface of the holder cover 260 that faces the holder body 250.

In particular, the snap-fit coupling portion 262 may be provided as a plurality of snap-fit coupling portions 262 spaced apart from one another in the circumferential direction of the holder cover 260.

As described above, in the embodiment of the present disclosure, the snap-fit coupling portions 262 provided on the holder cover 260 are coupled to the coupling holes 256 provided in the holder body 250, which may stably maintain the state in which the holder cover 260 presses the temperature sensor 300 against the coils 110. Therefore, it is possible to obtain an advantageous effect of more stably maintaining the contact state between the temperature sensor 300 and the coils 110.

In addition, in case that the posture and position of the snap-fit coupling portion 262 are misaligned with the coupling hole 256, the snap-fit coupling portion 262 cannot be accurately inserted into the coupling hole 256, and the holder cover 260 is disposed to be movable (rotatable) in an abnormal posture with respect to the holder body 250. Therefore, an operator may easily recognize whether the holder cover 260 is erroneously assembled.

According to the exemplary embodiment of the present disclosure, the motor 10 may include support grooves 258 provided in one surface of the holder body 250 that faces the holder cover 260, and support protrusions 264 provided on the holder cover 260 and accommodated in the support grooves 258.

The support protrusion 264 may have various structures in accordance with required conditions and design specifications. The present disclosure is not restricted or limited by the structure and shape of the support protrusion 264.

For example, the support protrusion 264 may have an approximately straight plate shape. The support protrusion 264 may be provided as a plurality of support protrusions 264 spaced apart from one another in the circumferential direction of the holder cover 260 and disposed between the adjacent coils 110.

In particular, the support protrusion 264 may be integrated with the holder cover 260 by injection molding. According to another embodiment of the present disclosure, the guide protrusion may be manufactured separately and then coupled to the holder cover.

As described above, in the embodiment of the present disclosure, the support protrusions 264 and the support grooves 258 are provided to be disposed between the adjacent coils 110. Therefore, it is possible to obtain an advantageous effect of improving insulation properties, more effectively suppressing vibration and noise, and minimizing withdrawal of foreign substances produced during a process of fusing the coils 110 and the terminals 210.

Meanwhile, in the embodiment of the present disclosure illustrated and described above, the example has been described in which the temperature sensor is assembled to the sensor holder of the holder (accommodated in the sensor accommodation portion). However, according to another embodiment of the present disclosure, the temperature sensor 300 and the sensor holder 270 may be integrated by injection molding.

Figure 7:
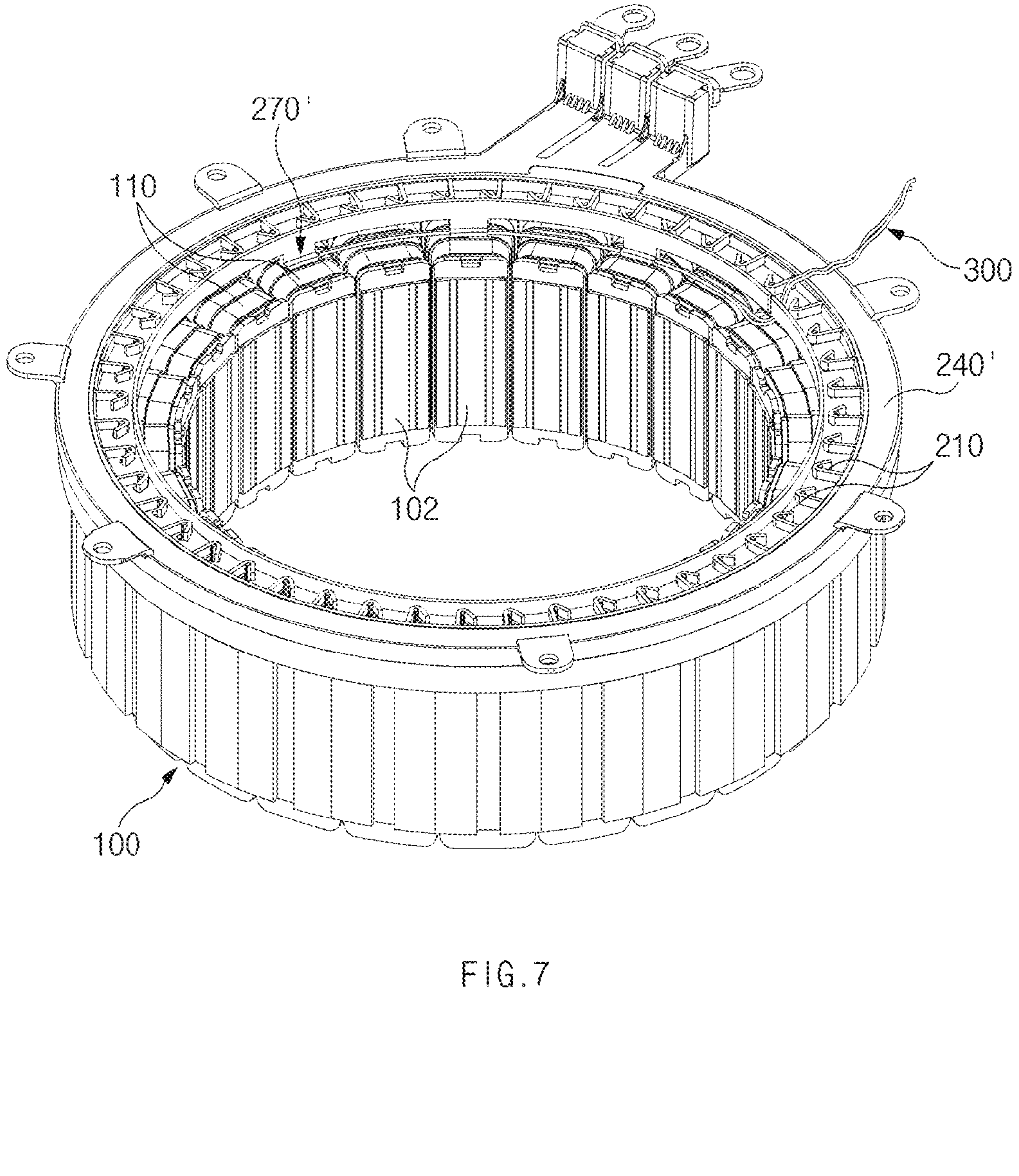
FIGS. 7 to 9 are views for explaining a motor according to another embodiment of the present disclosure.
Figure 8:
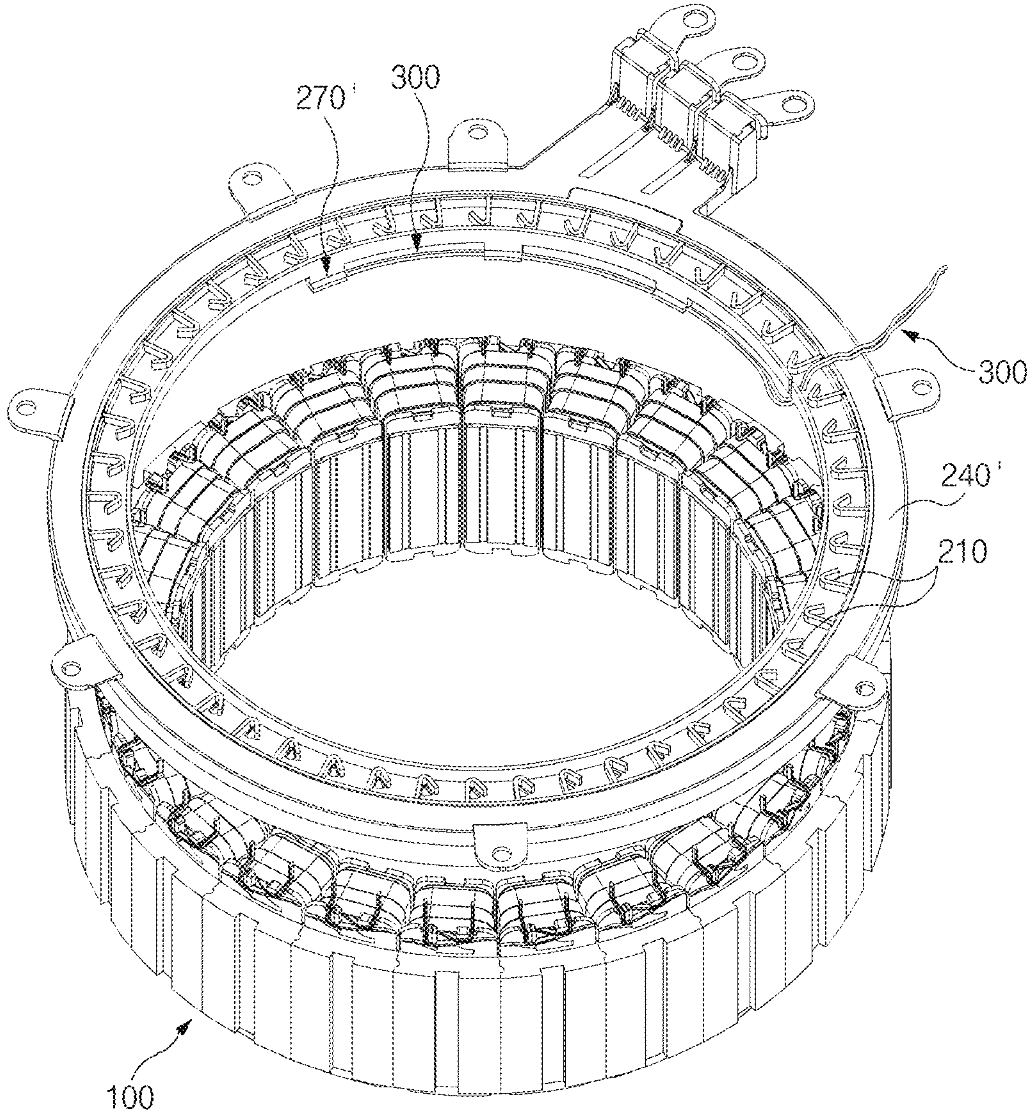
Figure 9:
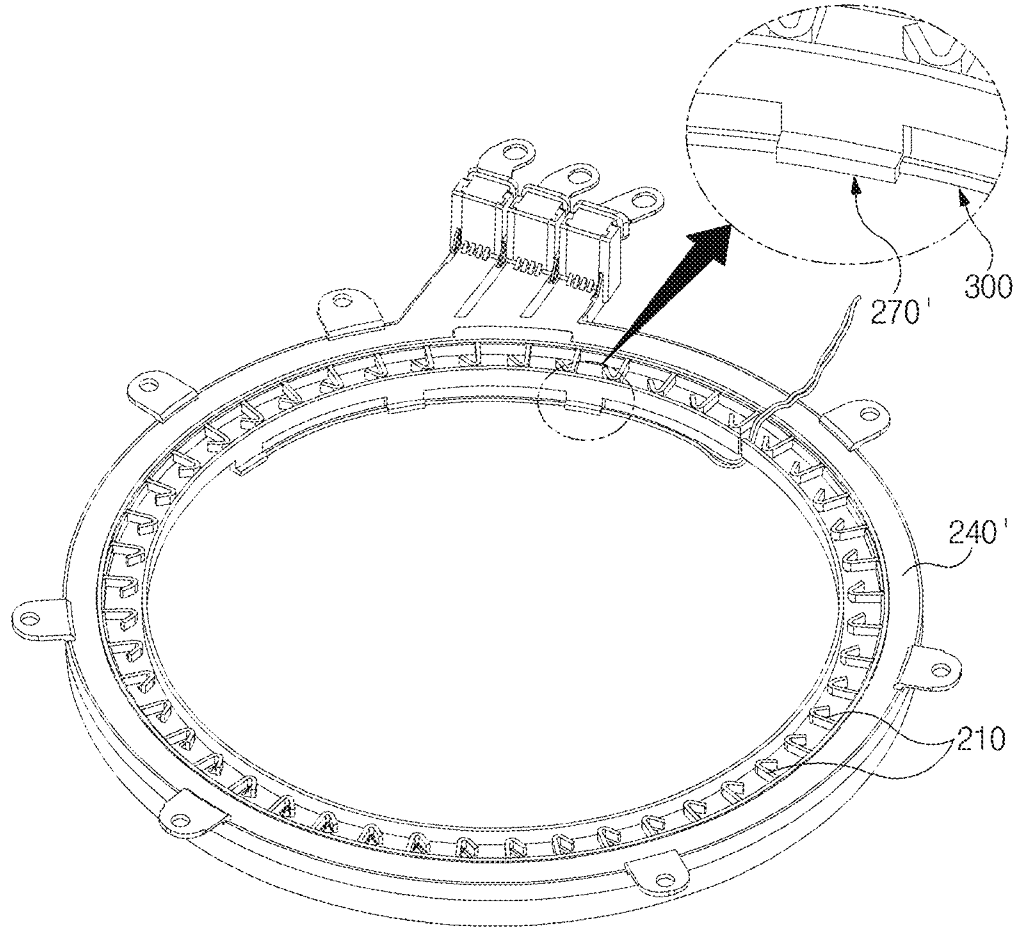

With reference to FIGS. 7 to 9, the motor 10 according to the embodiment of the present disclosure may include the stator 100 with the wound coils 110, the terminals 210 provided to be in electrical contact with the coils 110, a holder 240' configured to support the terminals 210, sensor holders 270' provided on the holder 240', and the temperature sensor 300 supported on the sensor holders 270' and provided to be in contact with the coils 110. The temperature sensor 300 may be integrated with the sensor holders 270' by injection molding.

The holder 240' may have various structures capable of being integrated with the temperature sensor 300 by injection molding. The present disclosure is not restricted or limited by the structure and shape of the holder 240'.

For example, the holder 240' may be provided in a shape that includes only the holder body (see 250 in FIG. 2) without a separate holder cover (see 260 in FIG. 2).

According to the exemplary embodiment of the present disclosure, the temperature sensor 300, together with the terminals 210, may be integrated with the holder 240' by insert-injection molding.

The sensor holder 270' may have various structures capable of being supported on the holder 240 to bring the temperature sensor 300 into contact with the coils 110. The present disclosure is not restricted or limited by the structure and shape of the sensor holder 270'.

According to the embodiment of the present disclosure described above, it is possible to obtain an advantageous effect of simplifying the structure and assembling process and improving the stability and reliability.

In particular, in the embodiment of the present disclosure, the temperature sensor for monitoring the temperature of the motor may be mounted on the coils without using a separate jig and a bonding agent.

In addition, according to the embodiment of the present disclosure, it is possible to obtain an advantageous effect of stably maintaining the mounted state of the temperature sensor and minimizing damage to and withdrawal of the temperature sensor.

In addition, according to the embodiment of the present disclosure, it is possible to obtain an advantageous effect of reducing costs, improving the work efficiency, and reducing the manufacturing time.

In addition, according to the embodiment of the present disclosure, it is possible to obtain an advantageous effect of minimizing the erroneous assembly of the temperature sensor and improving the accuracy.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A motor comprising:
a stator comprising a wound coil;
a terminal provided to be in electrical contact with the wound coil;
a holder configured to support the terminal;
a sensor holder provided on the holder; and
a temperature sensor supported on the sensor holder and provided to be in contact with the wound coil,
wherein the temperature sensor comprises:
a sensor body; and
a sensor cable electrically connected to the sensor body, and
wherein the sensor holder comprises:
a first sensor holder configured to support the sensor body; and
a second sensor holder spaced apart from the first sensor holder in a circumferential direction of the holder and configured to support the sensor cable.

2. The motor of claim 1, wherein the holder comprises:
a holder body configured to support the terminal; and
a holder cover stacked on the holder body and configured to cover the terminal, and
wherein the sensor holder is provided on the holder cover.

3. The motor of claim 2, wherein the sensor holder comprises:
a first sensor support portion provided on an inner circumferential surface of the holder and protruding from one surface of the holder that faces the wound coil; and
a second sensor support portion provided at an end of the first sensor support portion and configured such that the first sensor support portion and the second sensor support portion collectively define a sensor accommodation portion in which the temperature sensor is accommodated.

4. The motor of claim 3, wherein the second sensor support portion is configured to be elastically moved toward or away from the first sensor support portion, and the temperature sensor is elastically supported between the first sensor support portion and the second sensor support portion.

5. The motor of claim 3, comprising:
a guide protrusion provided on an inner surface of the holder cover and configured to support the first sensor support portion on the holder cover.

6. The motor of claim 5, comprising:
a first guide groove provided in the holder body and configured to accommodate the guide protrusion; and
a second guide groove provided in the holder body and configured to communicate with the first guide groove and accommodate the first sensor support portion.

7. The motor of claim 2, comprising:
a coupling hole provided in the holder body; and
a snap-fit coupling portion provided on the holder cover and coupled to the coupling hole in a snap-fit manner.

8. The motor of claim 2, comprising:

a guide groove provided in one surface of the holder body that faces the holder cover; and a guide protrusion provided on the holder cover and configured to be accommodated in the guide groove.

9. The motor of claim 1, wherein the temperature sensor is integrated with the sensor holder by injection molding.

* * * * *